United States Patent
Chen

(10) Patent No.: US 7,253,667 B2
(45) Date of Patent: Aug. 7, 2007

(54) CLOCK ADJUSTING METHOD AND ELECTRONIC DEVICE WITH CLOCK ADJUSTING FUNCTION

(75) Inventor: Wen-Kuan Chen, Hsinchu County (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 69 days.

(21) Appl. No.: 11/160,878

(22) Filed: Jul. 14, 2005

(65) Prior Publication Data

US 2006/0186939 A1 Aug. 24, 2006

(30) Foreign Application Priority Data

Feb. 24, 2005 (TW) .............................. 94105553 A

(51) Int. Cl.
*H03L 7/00* (2006.01)

(52) U.S. Cl. ...................... 327/141; 327/142; 327/291
(58) Field of Classification Search ........ 327/141–143, 327/291
See application file for complete search history.

(56) References Cited

U.S. PATENT DOCUMENTS 5,519,345 A * 5/1996 Farrell et al. ................ 327/108
6,600,355 B1 * 7/2003 Nguyen ....................... 327/298

* cited by examiner

*Primary Examiner*—Dinh T. Le
(74) *Attorney, Agent, or Firm*—Jiang Chyun IP Office

(57) ABSTRACT

A method for adjusting a clock and an electronic device with clock adjusting function are provided. In the method of adjusting the clock, the electronics device is driven with a first clock when the electronic device is during the reset-inactive state. Then, the electronic device is driven with a second clock when the electronic device receives a reset signal. Wherein, the cycle of the second clock is larger than that of the first clock.

13 Claims, 5 Drawing Sheets

CLOCK ADJUSTING METHOD AND ELECTRONIC DEVICE WITH CLOCK ADJUSTING FUNCTION

CROSS-REFERENCE TO RELATED APPLICATION

This application claims the priority benefit of Taiwan application serial no. 94105553, filed on Feb. 24, 2005. All disclosure of the Taiwan application is incorporated herein by reference.

BACKGROUND OF THE INVENTION

1. Field of the Invention

The present invention relates to an adjusting method and an electronic device, and more particularly, to a method for adjusting a clock and an electronic device with the clock adjusting function.

2. Description of the Related Art

In design of electronic circuits, reset mechanisms are usually added in the circuits so that the electronic circuits return to the initial state if required. Especially at the beginning when electronic circuits are turned on (started), elements (such as registers) of the circuits are unstable. Thus, the circuits should be reset so that the elements of the circuits will be set as an initial state.

FIG. 1A is a circuit diagram showing a traditional electronic device. FIG. 1B is a configuration showing a time sequence of the electronic device of FIG. 1A. Referring to FIGS. 1A and 1B, the prior art electronic device 100 comprises a digital logic circuit group 110, a synchronizer 120 and a reset network 130. The electronic device 100 functions according to an input clock CLK_IN. When a reset signal RESET is inputted from outside to the electronic device 100, the reset signal RESET is first synchronized by the synchronizer 120. Then, the synchronized reset signal RESET is transmitted to the digital logic circuit group 110 through the reset network 130 so as to reset all elements in the digital logic circuit group 110.

Referring to FIG. 1B, usually all elements in the digital logic circuit group 110 should be reset during a cycle TCLK_IN of the input clock CLK_IN to make sure that the subsequent input signals are in operation. In the high-frequency electronic device 100, not only the cycle TCLK_IN of the input clock CLK_IN is extremely short, but also the number of elements of the digital logical circuit group 110 becomes large. Wherein, the number of sequential logic registers will also be increased. In order to make the cycle TRESET of the reset signal corresponding to each register accommodate the specification and be smaller than the cycle TCLK_IN, the cost will be tremendous. For example, the circuit may require a more sophisticated reset network 110. In a high-frequency IC layout, it costs substantial labor and layout areas to overcome the issue. As a result, the cost of the electronic device is increased and the schedule of putting products on the market is delayed.

SUMMARY OF THE INVENTION

Accordingly, the present invention is directed to a method of adjusting a clock. The method is adapted to extend the time of executing the reset operation.

The present invention is also directed to an electronic device with clock adjusting function. The complexity of the circuit layout design of the electronic device can be reduced.

The present invention provides a method of adjusting a clock. The method is adapted for an electronic device. In the method of adjusting the clock, an input clock is received. The electronic device is driven with a first clock when the electronic device is in a reset-inactive state. A reset-preparing state is entered after a reset signal is received during the reset-inactive state. The reset signal is synchronized as a system reset signal during the reset-preparing state according to the input clock. A reset state is entered after the reset-preparing state is maintained for at least one cycle of the first clock. The electronic device is driven with the system reset signal and a second clock during the reset state. The reset-inactive state is returned after at least one cycle of the second clock. Wherein, the cycle of the second clock is larger than the cycle of the first clock.

In the method of adjusting the clock, after the reset signal is received, the reset-preparing state is entered at the beginning of a next complete cycle of the first clock, for example.

In addition, the reset state is maintained for a plurality of cycles of the second clock, for example.

The present invention provides an electronic device with clock adjusting function. The electronic device comprises an operating unit, a clock switch, a clock switch control state machine and a synchronizer. The operating unit receives a system reset signal and a system clock for operation. The clock switch receives a first clock and a second clock, wherein a cycle of the second clock is larger than a cycle of the first clock. The clock switch control state machine controls the clock switch to output the first clock as a system clock during a reset-inactive state. After a reset signal is received, the clock switch control state machine enters into a reset-preparing state. After the reset-preparing state is maintained with at least one cycle of the first clock, the clock switch control state machine enters into a reset state. While the reset state is entered, the clock switch outputs the second clock as the system clock. The synchronizer receives an input clock from outside and the reset signal from the clock switch control state machine. According to the input clock, the reset signal is synchronized as the system reset signal. While the clock switch control state machine enters into the reset state, the system reset signal is outputted to the operating unit.

In the electronic device with clock adjusting function, after the clock switch outputs at least one cycle of the second clock, the clock switch control state machine returns to the reset-inactive state and controls the clock switch to output the first clock as the system clock, for example.

Additionally, the electronic device with clock adjusting function described above further comprises a first clock generator to generate and output the first clock.

Additionally, the electronic device with clock adjusting function described above further comprises a second clock generator to generate and output the second clock.

The electronic device with clock adjusting function described above further comprises a reset network. The system reset signal is outputted from the synchronizer to the operating unit through the reset network, for example. The reset network includes a buffer circuit.

The present invention provides another electronic device with clock adjusting function. The electronic device comprises an operating unit, a clock shaper and a synchronizer. The operating unit receives a system reset signal and a system clock for operation. The clock shaper receives an input clock and shapes it as a first clock or a second clock, wherein a cycle of the second clock is larger than a cycle of the first clock. The synchronizer receives the input clock and a reset signal, and responds to the reset signal to output a clock shaping signal to the clock shaper. According to the input clock, the reset signal is synchronized as the system reset signal. After the clock shaping signal has been outputted, the system reset signal is outputted to the operating unit.

If the clock shaper does not receive the clock shaping signal, the first clock is outputted as the system clock; and if the clock shaper receives the clock shaping signal, the second clock is outputted as the system clock.

In the electronic device with clock adjusting function described above, after outputting at least one cycle of the second clock as the system clock, the clock shaper switches outputting, for example, the first clock as the system clock.

Additionally, the electronic device with clock adjusting function described above further comprises a reset network. The system reset signal is outputted from the synchronizer to the operating unit through the reset network, for example. The reset network includes a buffer circuit.

Accordingly, in the method for adjusting the clock and electronic device with clock adjusting function, more reset time can be obtained to reduce the cost of circuit layout design. In addition, the electronic device after the reset process continues the high-frequency operations with a shorter cycle of the first clock.

The above and other features of the present invention will be better understood from the following detailed description of the preferred embodiments of the invention that is provided in communication with the accompanying drawings.

DESCRIPTION OF SOME EMBODIMENTS

Figure 1A:
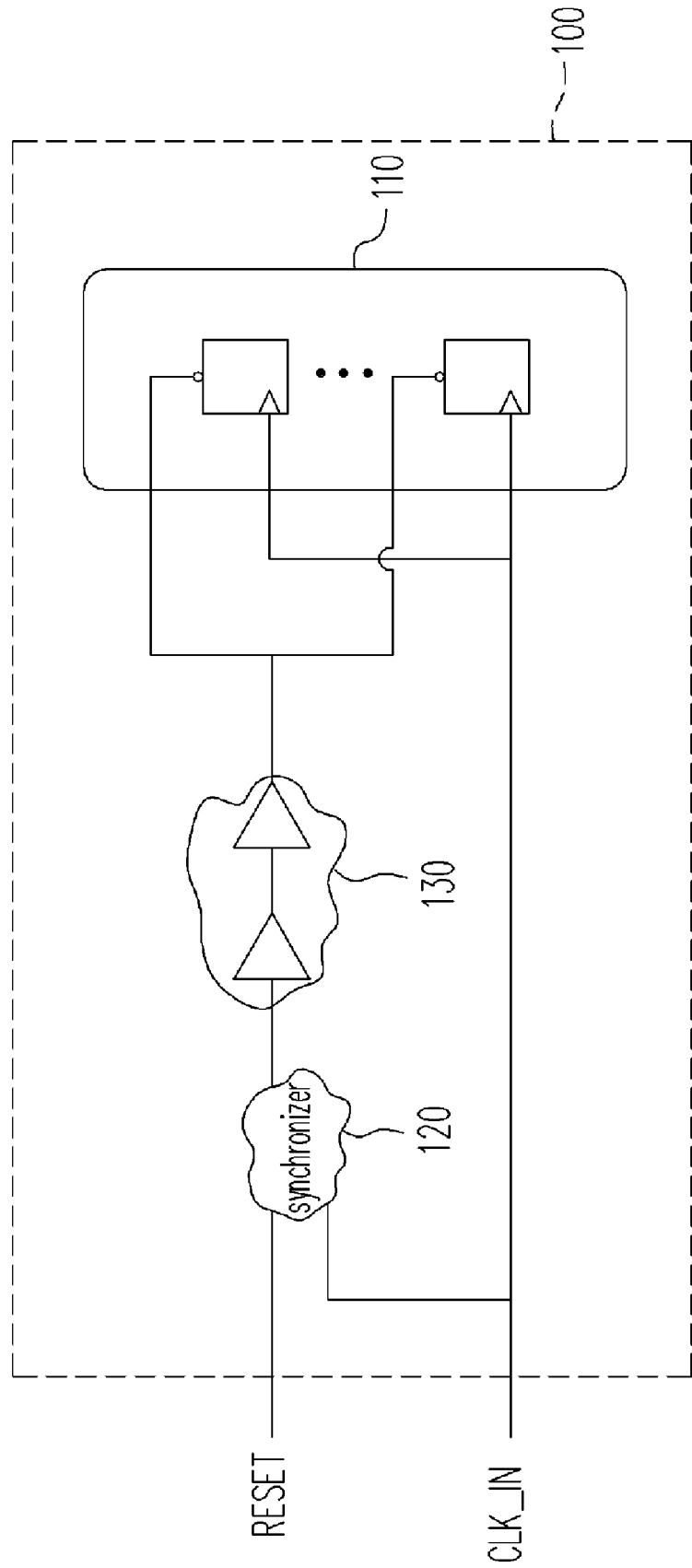
FIG. 1A is a circuit diagram showing a traditional electronic device.
Figure 1B:
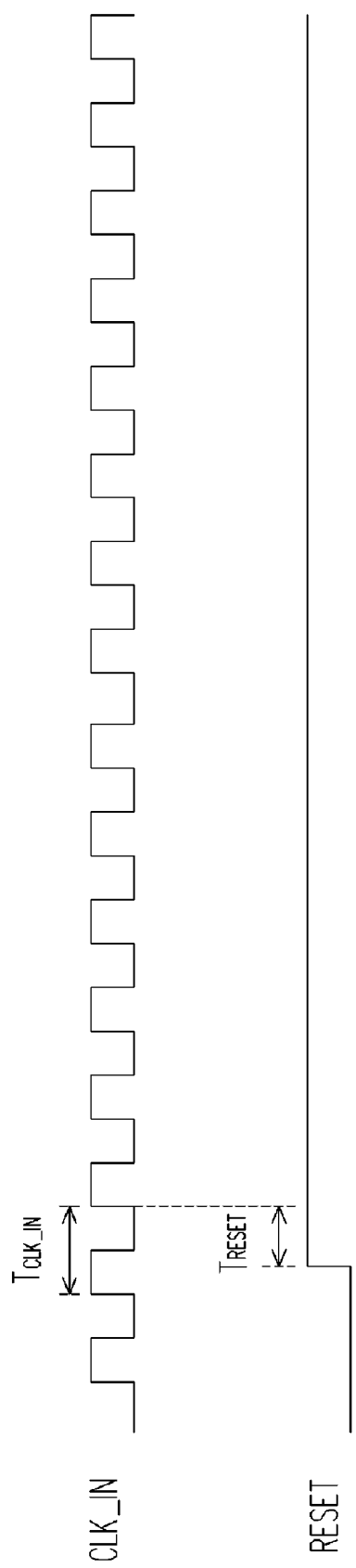
FIG. 1B is a configuration showing a time sequence of the electronic device of FIG. 1A.
Figure 2:
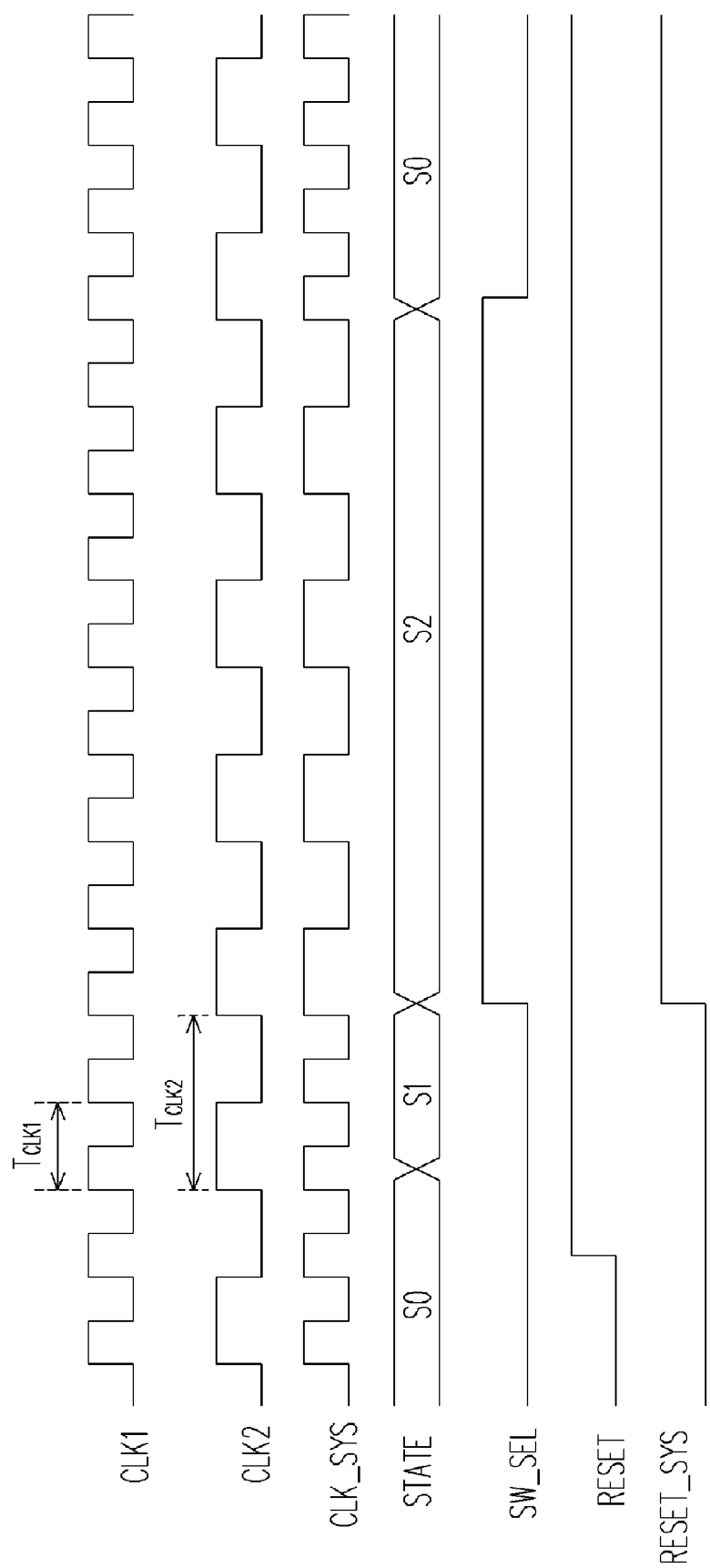
FIG. 2 is a configuration showing time sequences of various clocks, signals and states of a method of adjusting a clock according to an embodiment of the present invention.

FIG. 2 is a configuration showing time sequences of various clocks, signals and states of a method of adjusting a clock according to an embodiment of the present invention. Referring to FIG. 2, the method of adjusting the clock of the present invention is adapted for an electronic device. The electronic device can be, for example, integrated circuits (ICs) or other electronic devices with specific functions. In the electronic device related to the method of adjusting the clock, an input clock is received from outside. According to the input clock, other signals and clocks are synchronized.

In the method of adjusting the clock, when the electronic device is in a reset-inactive state S0, the first clock CLK1 serves as the system clock CLK_SYS to drive the electronic device. After receiving the reset signal RESET during the reset-inactive state S0, the electronic device enters into a reset-preparing state S1.

During the reset-preparing state S1, the reset signal RESET is synchronized as the system reset signal RESET_SYS according to the input clock. In order to maintain sufficient time for synchronization, it is desired that the reset-preparing state S1 is maintained for at least a cycle of the first clock CLK1. Then, the reset state S2 is entered. In other words, after the reset signal RESET is received, the system reset signal RESET_SYS starts the reset operation to the whole electronic device at least after one cycle of the first clock CLK1. In addition, after the reset signal RESET is received, the reset-preparing state S1 is entered at the beginning of the next complete cycle of the first clock CLK1, for example.

During the reset state S2, the system reset signal RESET_SYS serves reset operation to the whole electronic device. Moreover, during the whole reset state S2, the second clock CLK2 serves as the system clock CLK_SYS to drive the electronic device. Wherein, the cycle TCLK2 of the second clock CLK2 is larger than the cycle TCLK1 of the first clock CLK1. The reset state S2 is maintained for at least one cycle of the second clock CLK2. It is desired that the reset state S2 is maintained for two or more cycles of the second clock CLK2.

The electronic device then returns from the reset state S2 to the reset-inactive state S0. It means that the first clock CLK1 serves as the system clock CLK_SYS. After the reset operation, the electronic device continues the high-frequency operation.

As described above, during the reset state S2, the long cycle of the second clock CLK2 is used in the electronic device. Accordingly, in the method of adjusting the clock, the reset operation for the electronic device can be easily completed during a cycle of the system clock CLK_SYS. In addition, the time of the reset state S2 can be extended.

Figure 3:
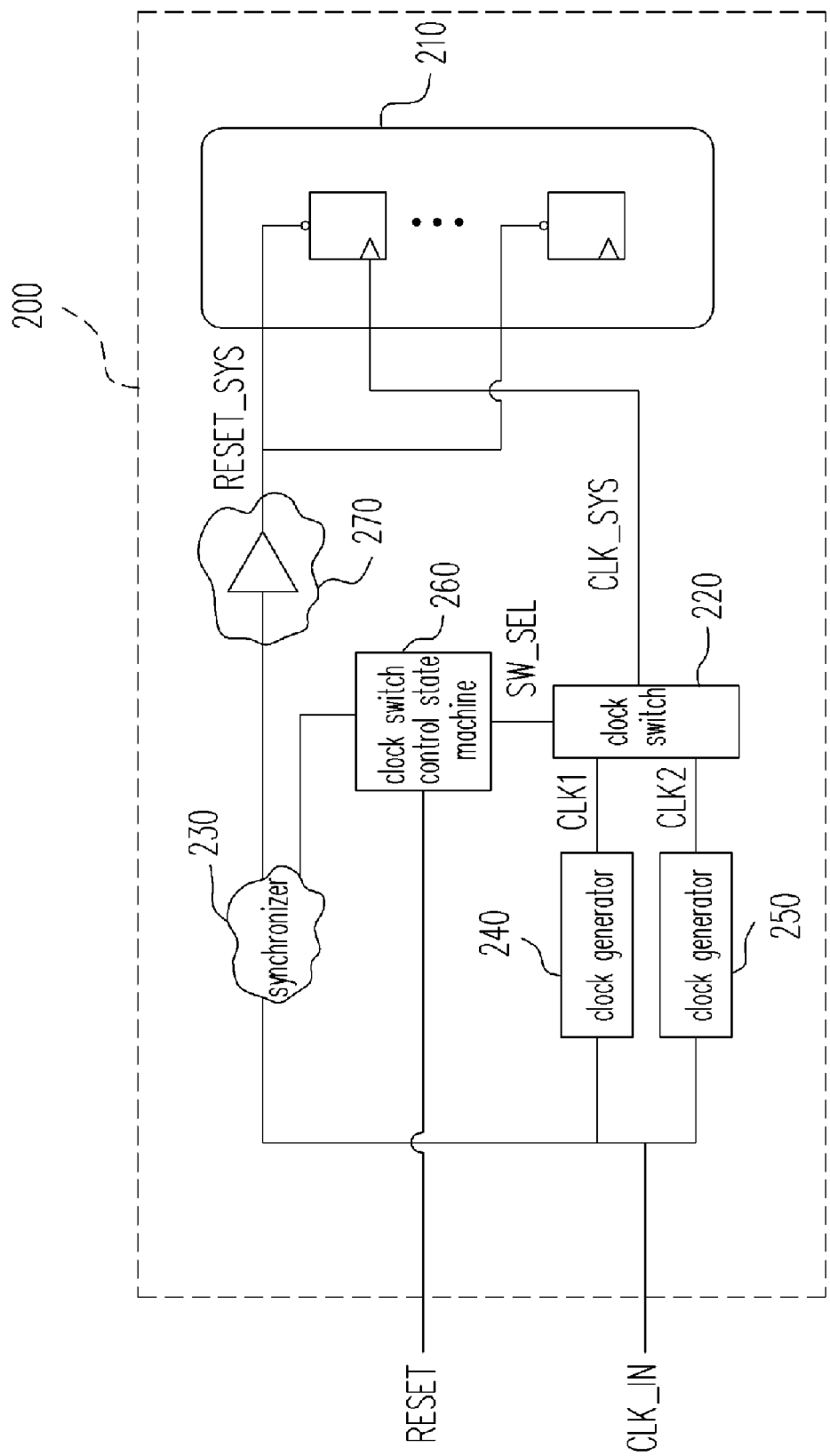
FIGS. 3 and 4 are circuit diagrams showing electronic devices for adjusting a clock according to embodiments of the present invention.
Figure 4:
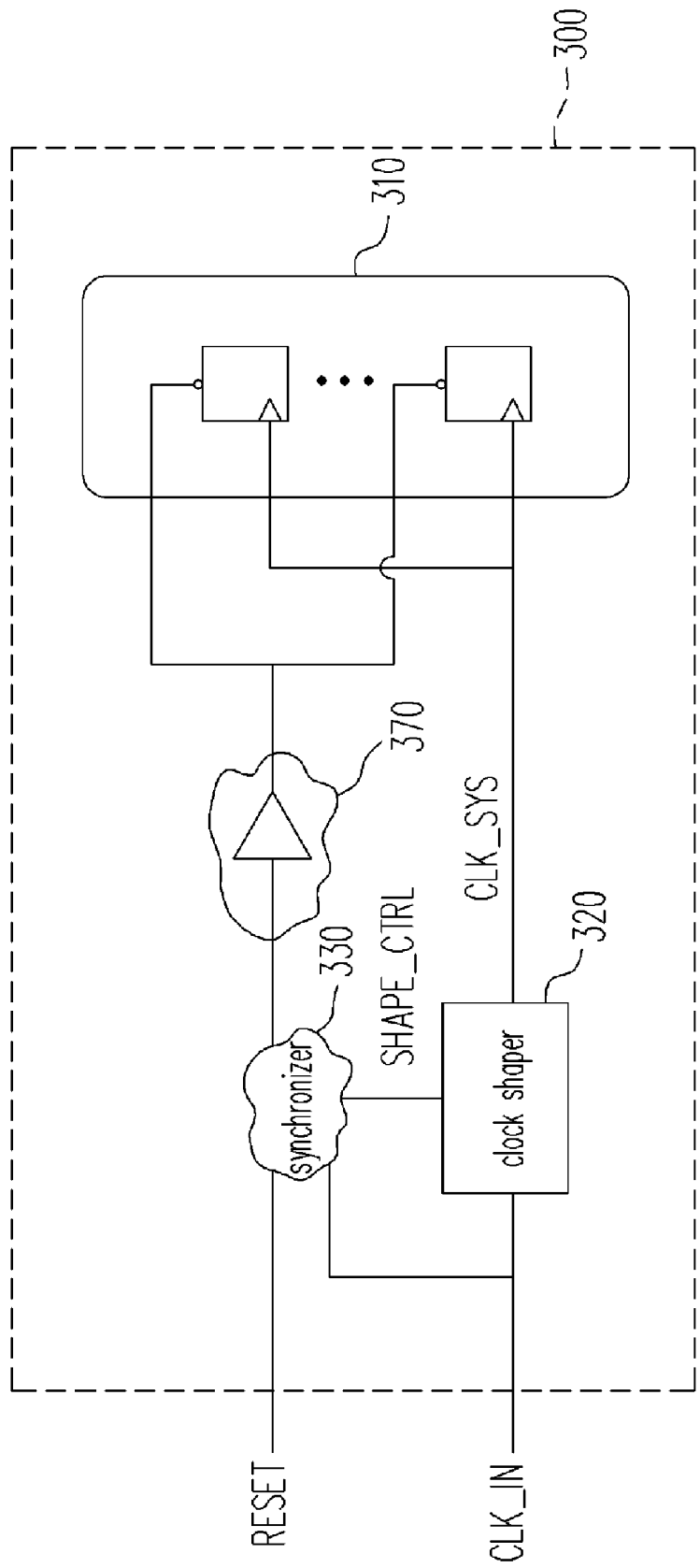

FIGS. 3 and 4 are circuit diagrams showing electronic devices for adjusting a clock according to embodiments of the present invention. Accompanied with these figures, following are descriptions of electronic devices with the clock adjusting function according to two embodiments of the present invention.

Referring to FIGS. 2 and 3, the electronic device 200 with the clock adjusting function of this embodiment comprises an operating unit 210, a clock switch 220, a synchronizer 230 and a clock switch control state machine 260. The operating unit 210 receives the system reset signal RESET_SYS and a system clock CLK_SYS for operation. The operating unit 210 shown in FIG. 3 is an embodiment of the present invention. The operating unit 210 may have various circuit design layouts so that the operating unit 210 suffices different operations of the electronic device 200. For example, the operating unit 210 can be a logic circuit group.

The clock switch 220 receives the first clock CLK1 and the second clock CLK2. Wherein, the cycle TCKL2 of the second clock CLK2 is larger than the cycle TCKL1 of the first cycle CLK1. The electronic device 200 may further comprise, for example, a first clock generator 240 and a second clock generator 250. The first clock CLK1 and the second clock CLK2 are generated by the first clock generator 240 and the second clock generator 250, respectively. In some embodiments, the first clock CLK1 and the second clock CLK2 are provided from outside. In addition, the first clock CLK1 and the second clock CLK2 are generated according to an input clock CLK_IN.

The clock switch control state machine 260 is coupled to the synchronizer 230 and the clock switch 220, receiving the reset signal RESET from outside. During the reset-inactive state S0, the clock switch control state machine 260 controls the clock switch 220 to output the first clock CLK1 serving as the system clock CLK_SYS. Moreover, after receiving the reset signal RESET, the clock switch control state machine 260 enters into the reset-preparing state S1. The reset-preparing state S1 is maintained for at least one cycle of the first clock CLK1, and then the rest state S2 is entered. While the reset state S2 is entered, the clock switch control state machine 260 controls the clock switch 220 to output the second clock CLK2 serving as the system clock CLK_SYS. Wherein, the clock switch control state machine 260 outputs the clock switch signal SW_SEL to the clock switch 220 so as to let the clock switch 220 output the second clock CLK2, for example.

The synchronizer 230 receives the input clock CLK_IN from outside and the reset signal RESET from the clock switch control state machine 260. When receiving the reset signal RESET, i.e., during the reset-preparing state S1, the synchronizer 230 synchronizes the reset signal RESET as the system reset signal RESET_SYS according to the input clock CLK_IN. After the clock switch control state machine 260 controls the clock switch 220 to output the second clock CLK2, i.e. after entering into the reset state S2, the system reset signal RESET_SYS is outputted from the synchronizer 230 to the operating unit 210. When the operating unit 210 receives the system reset signal RESET_SYS from the synchronizer 230, the reset operation is finished during the reset state S2.

Before the clock switch 220 receives the clock switch signal SW_SEL, i.e., the electronic device 200 is in the reset-inactive state S0 or the reset-preparing state S1, the clock switch 220 outputs the first clock CLK1 serving as the system clock RESET_SYS. In order to provide sufficient time to the operating unit 210 for the reset operation, after the clock switch 220 receives the clock switch signal SW_SEL, i.e., during the reset state S2, the clock switch 220 switches outputting the long-cycle second clock CLK2 serving as the system clock CLK_SYS.

In other words, when the operating unit 210 receives the system reset signal RESET_SYS and performs the reset operation, the clock switch 220 outputs the second clock CLK 2 having a cycle larger than that of the first clock CLK1, and the second clock CLK2 serves as the system clock RESET_SYS. Accordingly, the operating unit 210 has sufficient time for reset operation. The circuit layout design of the operating unit 210 becomes simplified, and the design cost is reduced.

In the electronic device 200, after outputting at least one cycle of the second clock CLK2 as the system clock CLK_SYS, i.e., after the operating unit 210 finishes the reset operation, the clock switch 220 returns to the reset-inactive state S0, i.e., the first clock CLK1 serves as the system clock CLK_SYS. Accordingly, the electronic device 200 continues subsequent high-frequency operations.

In the complicate digital circuit, it is difficult for a system reset signal RESET_SYS to be transmitted to the circuit group of the whole operating unit 210 during the same cycle of the system clock CLK_SYS. To solve the problem, in addition to the long-cycle second clock CLK2 serving as the system clock CLK_SYS during the reset state S2, the electronic device 200 with clock adjusting function may further comprise a reset network 270. The synchronizer 230 outputs the system reset signal RESET_SYS to the operating unit 210 through the reset network 270, for example. For example, the reset network 270 includes a buffer circuit composed of one or more buffers to balance delays of all routes so that the delay times of all routes are similar to each other.

Referring to FIGS. 2 and 4, the electronic device 300 for adjusting the clock of another embodiment of the present invention comprises an operating unit 310, a clock shaper 320 and a synchronizer 330. The operating unit 310 is similar to the operating unit 210 of the above embodiment. The synchronizer 330 also is similar to the synchronizer 230 of the above embodiment. In this embodiment, when the synchronizer 330 receives and responds to the reset signal RESET to output a clock shaping signal SHAPE_CTRL to the clock switch 320. In addition, like the electronic device 200, the electronic device 300 of FIG. 3 may further comprise the reset network 370 which is similar to the reset network 270.

The clock shaper 320 receives and shapes the input clock CLK_IN as the first clock CLK1 or the second clock CLK2. Wherein, the cycle TCKL2 of the first clock CLK1 is larger than the cycle TCKL1 of the first clock CLK1. If the clock shaper 320 does not receive the clock shaping signal SHAPE_CTRL, i.e., the electronic device 300 is in the reset-inactive state, the input clock CLK_IN is shaped as the first clock CLK1 serving as the system clock CLK_SYS. If the clock shaper 320 receives the clock shaping signal SHAPE_CTRL, the input clock CLK_IN is shaped as the second clock CLK2 serving as the system clock CLK_SYS. Accordingly, the design cost of the electronic device 300 of this embodiment is thus reduced. Of course, the operations of the synchronizer 330 and the clock shaper 320 can be divided into three states: the reset-inactive state S0, the reset-preparing state S1 and the reset state S2 as shown in FIG. 2.

In the electronic device 300, after the clock shaper 320 outputs a cycle of the second clock CLK2 as the system clock CLK_SYS, i.e., after the operating unit 310 finishes the reset operation, the output is switched to the first clock CLK1 as the system clock CLK_SYS, for example. Accordingly, the electronic device 300 of this embodiment may continue subsequent high-frequency operations.

Accordingly, in the method for adjusting the clock and the electronic device with clock adjusting function of the present invention, the first clock serves to drive the electronic device during the reset-inactive state. After the electronic device receives the reset signal, and the reset signal is synchronized as the system reset signal, the second clock serves to drive the electronic device and to reset the system. Moreover, the cycle of the second period is larger than that of the first clock. Accordingly, not only can more reset time be obtained to reduce the costs of circuit layout design, but also the electronic device after the rest process continues the high-frequency operations with a shorter cycle of the first clock.

Although the present invention has been described in terms of exemplary embodiments, it is not limited thereto. Rather, the appended claims should be constructed broadly to include other variants and embodiments of the invention which may be made by those skilled in the field of this art without departing from the scope and range of equivalents of the invention.

What is claimed is:

1. A method of adjusting a clock, adapted for an electronic device the method of adjusting the clock comprising:
   receiving an input clock;
   generating a first clock and a second clock from the input clock;
   driving the electronic device with the first clock when the electronic device is in a reset-inactive state, and entering into a reset-preparing state after a reset signal is received by the electronic device during the reset-inactive state;
   synchronizing the reset signal as a system reset signal during the reset-preparing state according to the input clock, and entering into a reset state after the reset-preparing state is maintained for at least one cycle of the first clock; and
   driving the electronic device with the system reset signal and the second clock during the reset state, and returning to the reset-inactive state after at least one cycle of the second clock, wherein the cycle of the second clock is larger than the cycle of the first clock.

2. The method of adjusting a clock of claim 1, wherein after the reset signal is received, the reset-preparing state is entered at the beginning of a next complete cycle of the first clock.

3. The method of adjusting a clock of claim 1, wherein the reset state is maintained for a plurality of cycles of the second clock.

4. An electronic device with clock adjusting function, comprising:
   an operating unit, receiving a system reset signal and a system clack for operation;
   a clock switch, receiving a first clock and a second clock, wherein a cycle of the second clock is larger than a cycle of the first clock;
   a clock switch control state machine, controlling the clock switch to output the first clock as a system clock during a reset-inactive state; after a reset signal is received, the clock switch control state machine entering into a reset-preparing state; after the reset-preparing state is maintained for at least one cycle of the first clock, the clock switch control state machine entering into a reset state; while entering the reset state, the clock switch outputs the second clock as the system clock; and
   a synchronizer, receiving an input clock from outside and the reset signal from the clock switch control state machine; the reset signal being synchronized as the system reset signal according to the input clock; while the clock switch control state machine enters into the reset state, the system reset signal being outputted to the operating unit.

5. The electronic device with clock adjusting function of claim 4, wherein after the clock switch outputs at least one cycle of the second clock, the clock switch control state machine returns to the reset-inactive state and controls the clock switch to output the first clock as die system clock.

6. The electronic device with clock adjusting function of claim 4, further comprising a first clock generator to generate and output the first clock.

7. The electronic device with clock adjusting function of claim 4, further comprising a second clock generator to generate and output the second clock.

8. The electronic device with clock adjusting function of claim 4, further comprising a reset network, the system reset signal being outputted from the synchronizer to the operating unit through die reset network.

9. The electronic device with clock adjusting function of claim 8, wherein the reset network includes a buffer circuit.

10. An electronic device with clock adjusting function, comprising:
   an operating unit, receiving a system reset signal and a system clock for operation;
   a clock shaper, receiving and shaping an input clock as a first clock or a second clock, wherein the first clock and the second clock serve as the system clock alternatively while operating the electronic device and a cycle of the second clock is larger than a cycle of the first clock; and
   a synchronizer, receiving the input clock and a reset signal, responding to the reset signal to output a clock shaping signal to the clock shaper; the reset signal being synchronized as the system reset signal according to the input clock; after the clock shaping signal is outputted, the system reset signal being outputted to the operating unit; wherein if the clock shaper does not receive the clock shaping signal, the first clock is outputted as the system clock; and if the clock shaper receives the clock shaping signal, the second clock is outputted as the system clock.

11. The electronic device with clock adjusting function of claim 10, wherein after outputting at least one cycle of the second clock as the system clock, the clock shaper switches outputting the first clock as the system clock.

12. The electronic device with clock adjusting function of claim 10, further comprising a reset network, the system reset signal being outputted from the synchronizer to the operating unit through the reset network.

13. The electronic device with clock adjusting function of claim 12, wherein the reset network includes a buffer circuit.

* * * * *